(12) United States Patent
Miao et al.

(10) Patent No.: US 9,394,949 B2
(45) Date of Patent: Jul. 19, 2016

(54) TRIPOD TYPE CONSTANT VELOCITY UNIVERSAL JOINT AND METHOD FOR PRODUCING SAME

(71) Applicants: Jiahua Miao, Shizuoka (JP); Shunsuke Makino, Shizuoka (JP); Hiroshi Murakami, Shizuoka (JP); Taku Itagaki, Shizuoka (JP); Hiroshi Adachi, Shizuoka (JP); Makoto Ikki, Shizuoka (JP)

(72) Inventors: Jiahua Miao, Shizuoka (JP); Shunsuke Makino, Shizuoka (JP); Hiroshi Murakami, Shizuoka (JP); Taku Itagaki, Shizuoka (JP); Hiroshi Adachi, Shizuoka (JP); Makoto Ikki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/355,281

(22) PCT Filed: Nov. 5, 2012

(86) PCT No.: PCT/JP2012/078608
§ 371 (c)(1),
(2) Date: Apr. 30, 2014

(87) PCT Pub. No.: WO2013/080751
PCT Pub. Date: Jun. 6, 2013

(65) Prior Publication Data
US 2014/0287841 A1    Sep. 25, 2014

(30) Foreign Application Priority Data
Nov. 28, 2011    (JP) .................................. 2011-259180

(51) Int. Cl.
*B21K 1/76* (2006.01)
*B23K 9/00* (2006.01)
(Continued)

(52) U.S. Cl.
CPC . *F16D 3/22* (2013.01); *B21K 1/763* (2013.01); *B23P 9/00* (2013.01); *B24B 19/08* (2013.01);
(Continued)

(58) Field of Classification Search
CPC .......... B21K 1/762; B21K 1/763; B23P 9/00; F16D 3/202; F16D 3/2055; F16D 3/22; F16D 2003/2023; F16D 2003/2026; B21D 53/88; B24B 19/08
USPC ............ 464/111, 120–124, 132, 905; 72/340; 29/428
See application file for complete search history.

(56) References Cited

U.S. PATENT DOCUMENTS 5,197,228 A * 3/1993 Sharkey et al. .................... 451/5
8,342,969 B2 * 1/2013 Izumino et al. ............... 464/111
(Continued)

FOREIGN PATENT DOCUMENTS

DE    102007059377    *    6/2009
JP    2002-195284        7/2002
(Continued)

OTHER PUBLICATIONS

Translation of JP 2010-255801 A. Wakamatsu, M. Tripod type constant velocity joint, has roll-off part retracted inside extension line of outer peripheral surface of torque-transmission area in cross section orthogonal to center axis, where area abuts inner roller. Nov. 11, 2010.*

(Continued)

*Primary Examiner* — Josh Skroupa
(74) *Attorney, Agent, or Firm* — Wenderoth, Lind & Ponack, L.L.P.

(57) ABSTRACT

A tripod type constant velocity universal joint includes an outer joint member including three track grooves having roller-guide surfaces arranged to face each other in a circumferential direction, a tripod member including three leg shafts projecting in a radial direction, and roller units each including a roller and an inner ring for supporting the roller in a freely rotatable manner. The inner ring is externally fitted to a corresponding one of the three leg shafts. The roller is movable along the roller-guide surfaces of a corresponding one of the three track grooves. Each of the three leg shafts includes a region formed into a substantially circular-arc shape in horizontal cross-section that is orthogonal to an axial line of each of the three leg shafts.

11 Claims, 11 Drawing Sheets

(51) Int. Cl.
*F16D 3/202* (2006.01)
*F16D 3/22* (2006.01)
*B23P 9/00* (2006.01)
*B24B 19/08* (2006.01)
*F16D 3/205* (2006.01)

(52) U.S. Cl.
CPC .............. *F16D 3/202* (2013.01); *F16D 3/2055* (2013.01); *F16D 2003/2023* (2013.01); *F16D 2003/2026* (2013.01); *Y10T 29/49826* (2015.01)

(56) References Cited

U.S. PATENT DOCUMENTS

2005/0059497 A1* 3/2005 Goto et al. ............... 464/111
2007/0049380 A1* 3/2007 Sugiyama ............... 464/111
2011/0053695 A1* 3/2011 Yun ............... 464/11

FOREIGN PATENT DOCUMENTS

JP 2010-255801 11/2010
JP 2011-185346 9/2011
WO WO 2010024083 * 3/2010

OTHER PUBLICATIONS

International Preliminary Report on Patentability and Written Opinion of the International Searching Authority issued Jun. 12, 2014 in International (PCT) Application No. PCT/JP2012/078608.

International Search Report issued Jan. 22, 2013 in International (PCT) Application No. PCT/JP2012/078608.

* cited by examiner

TRIPOD TYPE CONSTANT VELOCITY UNIVERSAL JOINT AND METHOD FOR PRODUCING SAME

BACKGROUND OF INVENTION

1. Technical Field

The present invention relates to a tripod type constant velocity universal joint and a method of manufacturing the tripod type constant velocity universal joint.

2. Background Art

In a constant velocity universal joint, which is used to construct a power transmission system for automobiles and various industrial machines, two shafts on a driving side and a driven side are coupled to each other to allow torque transmission therebetween, and rotational torque is transmitted at a constant velocity even when each of the two shafts forms an operating angle. The constant velocity universal joint is roughly classified into a fixed type constant velocity universal joint that allows only angular displacement, and a plunging type constant velocity universal joint that allows both the angular displacement and axial displacement. In a drive shaft for transmitting power from an engine of an automobile to a driving wheel, for example, the plunging type constant velocity universal joint is used on a differential side (inboard side), and the fixed type constant velocity universal joint is used on a driving wheel side (outboard side).

As an example of the plunging type constant velocity universal joint, a tripod type constant velocity universal joint has been known. As this tripod type constant velocity universal joint, which includes rollers serving as torque transmitting members, a single roller type and a double roller type have been known. FIGS. 12 to 15 exemplify a tripod type constant velocity universal joint of the double roller type (refer, for example, to Patent Document 1).

FIG. 12 is a partial vertical sectional view of the tripod type constant velocity universal joint, and FIG. 13 is a partial horizontal sectional view taken along the arrow K-K in FIG. 12. As illustrated in FIGS. 12 and 13, a tripod type constant velocity universal joint 101 includes, as a main part, an outer joint member 102, a tripod member 103 serving as an inner joint member, and roller units 104 serving as torque transmitting members. The outer joint member 102 is formed into a cup shape that is opened at one end, and has an inner peripheral surface having three linear track grooves 105 equiangularly formed therein so as to extend in an axial direction. On both sides of each of the track grooves 105, there are formed roller-guide surfaces 106 arranged to face each other in a circumferential direction and each extending in the axial direction. The outer joint member 102 receives therein the tripod member 103 and the roller units 104. The tripod member 103 includes three leg shafts 107 projecting in a radial direction. A shaft 109 is spline-fitted to a center hole 108 of the tripod member 103, and fixed in the axial direction with a stopper ring 110. The roller units 104 each include, as a main part, an outer ring 111 serving as a roller, an inner ring 112 arranged inside the outer ring 111 and externally fitted to the leg shaft 107, and needle rollers 113 interposed between the outer ring 111 and the inner ring 112. The roller units 104 are received in the track grooves 105 of the outer joint member 102. The inner ring 112 has an inner peripheral surface 112a formed into a convex circular-arc shape in vertical cross-section including an axial line of the inner ring 112. The roller unit 104 has a structure in which the inner ring 112, the needle rollers 113, and the outer ring 111 are prevented from being separated from each other with washers 114 and 115.

The leg shafts 107 of the tripod member 103 each have an outer peripheral surface formed into a straight shape in vertical cross-section including an axial line of the leg shaft 107. Further, as illustrated in FIG. 14 corresponding to a plan view as viewed from the arrow L-L in FIG. 12, the outer peripheral surface of the leg shaft 107 is formed into a substantially elliptical shape in horizontal cross-section that is orthogonal to the axial line of the leg shaft 107, and is held in contact with the inner peripheral surface 112a of the inner ring 112 in a direction that is orthogonal to an axial line of the joint, that is, a direction of a major axis "a" in a manner that clearances m are formed between the outer peripheral surface of the leg shaft 107 and the inner peripheral surface 112a of the inner ring 112 in a direction of the axial line of the joint, that is, a direction of a minor axis "b". In the constant velocity universal joint 101, the outer ring 111 of the roller unit 104 mounted to the leg shaft 107 of the tripod member 103 rolls on the roller-guide surfaces 106 of each of the track grooves 105 of the outer joint member 102. The leg shaft 107 is formed into a substantially elliptical shape in horizontal cross-section. Thus, as illustrated in FIG. 15, when the constant velocity universal joint 101 forms an operating angle, an axial line of the tripod member 103 is inclined with respect to an axial line of the outer joint member 102. Meanwhile, the roller unit 104 can be inclined with respect to the axial line of the leg shaft 107 of the tripod member 103, and hence the outer ring 111 of the roller unit 104 and the roller-guide surfaces 106 can be avoided from obliquely crossing each other. With this, the roller unit 104 properly rolls. Thus, inductive thrust and sliding resistance can be reduced, with the result that vibration of the joint can be reduced.

Next, description is made of a manufacturing step for the tripod member 103. In the tripod member 103, as illustrated in FIGS. 18a and 18b, a forged product 103' of the tripod member 103 is formed through full-enclosed forging using a die set formed of an upper die 120, a lower die 121, an upper punch 122, and a lower punch 123. Specifically, the upper die 120 and the lower die 121 are clamped to each other so as to define a forming space, and a cylindrical billet is put therein. Then, the upper punch 122 and the lower punch 123 are brought close to each other so that the billet is pressurized and filled between the dies 120 and 121. In this way, the forged product 103' including three leg shafts 107' is obtained. After that, the forged product 103' is finished through a machining process to have a spline hole, end portions of the leg shafts, and the like, and then is subjected to heat treatment.

After the heat treatment step, as illustrated in FIGS. 16 and 17, outer peripheral surface regions of the leg shaft 107, which are to be held in contact with the inner peripheral surface 112a of the inner ring 112 (refer to FIG. 14), are finished through grinding. FIG. 16 illustrates the leg shaft 107' under a state in which the heat treatment is completed. As illustrated in FIG. 16, the outer peripheral surface of each of the leg shafts 107' includes outer peripheral surface regions 107a' including the major axis "a" of the substantially elliptical shape. A permissible dimension of a grinding width of each outer peripheral surface region 107a' is denoted by a reference symbol A. A range of slow grinding feed along with rotation about an axial center O of the leg shaft 107' is denoted by a reference symbol B. Although not shown, in a process of this grinding, the forged product 103' is chucked with a grinding apparatus, and the leg shaft 107' is rotated, for example, in a counterclockwise direction about the axial center O of the leg shaft 107' so that the outer peripheral surface regions 107a' including the major axis "a" of the elliptical shape are ground with a grinding stone. At this time, in order to form the outer peripheral surface regions 107a' into the elliptical shape, the grinding stone is slightly advanced and retreated in synchronization with the rotation of the leg shaft 107' about the axial center O so that the outer peripheral surface regions 107a' are subjected to the grinding process into the elliptical shape.

A required grinding range corresponds to the permissible dimension A in FIG. 16. However, in consideration of inevitable variation in forging dimension and heat treatment deformation, the grinding feed range B is set to be significantly wider than the permissible dimension A of the grinding width. However, detailed description thereof is given later. A speed of the rotation of the leg shaft 107' about the axial center O at the time of the grinding process is set so that the slow grinding feed is performed in a range of an angle C corresponding to the range B, and that fast feed is performed without grinding in a range of an angle D. FIG. 17 illustrate the tripod member 103 as a finished product obtained by finishing outer peripheral surface regions 107a of the leg shafts 107 through grinding in this way. FIG. 17a is a partial vertical sectional view of the tripod member 103, and FIG. 17b is a right side view of FIG. 17a. Parts that are finished through grinding as illustrated in FIG. 17 correspond to the outer peripheral surface regions 107a including the major axis "a" of the substantially elliptical shape. When a grinding width that is equal to or larger than the permissible dimension A is secured, the tripod member 103 is regarded as a non-defective product.

PRIOR ART DOCUMENTS

Patent Documents

Patent Document 1: JP 2002-195284 A

Problems to be Solved by the Invention

However, in the grinding process on the above-mentioned outer peripheral surface regions 107a' including the major axis "a" of the leg shaft 107', also after grinding in the required grinding range, the process needs to be continued at a grinding feed rate until the grinding stone is separated from the leg shaft 107'. Thus, a range that is wider than the required grinding range is processed through slow grinding feed. In this way, in related-art methods, the range of the angle C at which the grinding feed is needed cannot be reduced, with the result that the range of the angle D at which fast feed is allowed cannot be increased. Therefore, shortening of cycle time is restrictive, which has been found to be a factor of deterioration in productivity.

Detailed description thereof is made with reference to FIGS. 10 and 11. FIG. 10 is an enlarged view of a horizontal cross-section that is orthogonal to an axial line of the leg shaft 107' under the state in which the heat treatment is completed (prior to the grinding process). As illustrated in FIG. 10, in the horizontal cross-section, the leg shaft 107' is formed into a substantially elliptical shape in which a range of from E to H and a range of from F to G that include the major axis "a" are each formed into a first elliptical shape, and a range of from E to F and a range of from G to H that include the minor axis "b" are each formed into a second elliptical shape. The minor axis "b" of the second elliptical shape is set to be slightly shorter than a minor axis of the first elliptical shape (not shown). Further, the range of from E to H and the range of from F to G each formed into the first elliptical shape are each formed correspondingly to a shape that is obtained by adding substantially uniform grinding margins to elliptical shapes of a finished product. The leg shaft 107' of the forged product is configured to obtain such a shape in horizontal cross-section, and hence the outer peripheral surface regions 107a' including the major axis "a" can be partially ground.

With reference to FIG. 11, description is made of the state of grinding of the leg shaft 107' having the above-mentioned shape in horizontal cross-section. FIG. 11a illustrates a ground state in a case where a grinding margin of each of the outer peripheral surface regions 107a' including the major axis "a" of the leg shaft 107' illustrated in FIG. 10 is small. FIG. 11b illustrates a ground state in a case where the grinding margin is large. FIGS. 11a and 11b each illustrate an upper half in a radial direction of the leg shaft 107', and the broken lines indicate surfaces after grinding finishing. Further, for the sake of simplicity of description, the grinding margins are illustrated on an exaggerated scale. In FIG. 11a, an actual grinding width X1 is small due to the small grinding margin, but the leg shaft 107' is a non-defective product because the permissible dimension A is secured. Meanwhile, in FIG. 11b, the leg shaft 107' is a non-defective product that secures the permissible dimension A, but an actual grinding width X2 is large due to the large grinding margin. This is because, as is clearly understood from FIGS. 11a and 11b, at both ends of each of the grinding widths X1 and X2, an oblique cross angle between the first elliptical shape of each of the range of from E to H and the range of from F to G illustrated in FIG. 10, which include the major axis "a", and the second elliptical shape of each of the range of from E to F and the range of from G to H illustrated in FIG. 10, which include the minor axis "b", is significantly low. Thus, even a slight difference between the grinding margins causes a significant difference between the actual grinding widths X1 and X2. However, also on a product having such a large grinding width X2, the grinding process needs to be performed at a grinding feed rate until the grinding stone is separated from the leg shaft 107'. Thus, it is inevitable to perform grinding over the range that is wider than the required grinding range (permissible dimension A).

Specifically, when the leg shaft 107' is ground by being rotated, for example, in the counterclockwise direction about the axial center O of the leg shaft 107', during the rotation, a fast feed rate is maintained in the range of the angle D in the left in FIG. 11b, and switched to the grinding feed rate at a left end of the range of the angle C. Then, the grinding is started from the left end of the grinding width X2 and ended at the right end of the grinding width X2, and the grinding stone is separated from the leg shaft 107'. However, the grinding feed rate is maintained until the right end of the range of the angle C is reached, and the feed rate is increased again to the fast feed rate after the range of the angle D is reached. Variation in grinding margin is minute but inevitable, and hence the angle C of the grinding feed and the angle D of the fast feed need to be set as described above. However, there has been found a problem in that shortening of cycle time is restrictive because the range B corresponding to the angle C at which the grinding feed rate is needed is significantly larger than the permissible dimension A of the required grinding range illustrated in FIG. 11a, resulting in failure to widen the range of the angle D at which fast feed is allowed. Note that, when fast grinding feed is performed as a countermeasure therefor, there arise technical problems of occurrence of grinding burn, damage to a workpiece, and occurrence of damage to the grinding stone, such as clogging.

Further, quality of products after the grinding is determined through measurement of the grinding widths X1 and X2 depending on whether or not the permissible dimension A is secured. In this way, quality inspection is complicated to require time and effort.

SUMMARY OF INVENTION

In view of the above-mentioned problems, it is an object of the present invention to provide a tripod type constant velocity universal joint capable of stably securing a grinding range of an outer peripheral surface region of a leg shaft of a tripod member, and achieving simple and efficient quality inspection, shortening of grinding cycle time, and reduction in manufacturing cost, and to provide a method of manufacturing the tripod type constant velocity universal joint.

Solutions to the Problems

Through various studies for achieving the above-mentioned object, the inventors of the present invention have conceived a novel idea of forming an outer peripheral surface of a leg shaft of a tripod member into a special shape such as a substantially elliptical shape so that a partial grinding range thereof is stably secured irrespective of a size of a grinding margin.

As a technical measure to achieve the above-mentioned object, according to one embodiment of the present invention, there is provided a tripod type constant velocity universal joint, comprising: an outer joint member comprising three track grooves each formed so as to have roller-guide surfaces arranged to face each other in a circumferential direction of the outer joint member; a tripod member comprising three leg shafts projecting in a radial direction of the tripod member; and roller units each comprising a roller and an inner ring for supporting the roller in a freely rotatable manner, the inner ring being externally fitted to corresponding one of the three leg shafts, the roller being movable along the roller-guide surfaces of corresponding one of the three track grooves, each of the three leg shafts comprising a region formed into a substantially circular-arc shape in horizontal cross-section that is orthogonal to an axial line of the each of the three leg shafts, the each of the three leg shafts having an outer peripheral surface held in contact with an inner peripheral surface of the inner ring in a direction that is orthogonal to an axial line of the tripod type constant velocity universal joint, the outer peripheral surface of the each of the three leg shafts and the inner peripheral surface of the inner ring having a clearance formed therebetween in a direction of the axial line of the tripod type constant velocity universal joint, the each of the three leg shafts comprising an outer peripheral surface region that is finished through grinding and held in contact with the inner peripheral surface of the inner ring, the each of the three leg shafts comprising a grinding relief portion formed at an end portion in the circumferential direction of the outer peripheral surface region. Here, the above-mentioned term "substantially circular-arc shape" means not only a circular shape, but also a quasi-circular shape, an oblong shape, and an elliptical shape.

According to the configuration described above, it is possible to stably secure the partial grinding range of the outer peripheral surface of the each of the three leg shafts of the tripod member, and to achieve simple and efficient quality inspection, shortening of grinding cycle time, and reduction in manufacturing cost.

Specifically, the inner peripheral surface of the inner ring may be formed into a convex circular-arc shape in vertical cross-section comprising an axial line of the inner ring. The outer peripheral surface of the each of the three leg shafts may be formed into a straight shape in vertical cross-section comprising the axial line of the each of the three leg shafts. The each of the three leg shafts may be formed into a substantially elliptical shape in the horizontal cross-section of the each of the three leg shafts. The substantially elliptical shape may comprise: a major axis formed in the direction that is orthogonal to the axial line of the tripod type constant velocity universal joint; and a minor axis formed in the direction of the axial line of the tripod type constant velocity universal joint. The outer peripheral surface region that is finished through the grinding may comprise the major axis. With this, in the tripod type constant velocity universal joint having the three leg shafts each formed into a special shape such as the substantially elliptical shape so that vibration thereof can be reduced, it is possible to stably secure a grinding width of the outer peripheral surface of the each of the three leg shafts, and to achieve simple and efficient quality inspection, shortening of grinding cycle time, and reduction in manufacturing cost.

The above-mentioned grinding relief portion may be formed not only into a flat shape but also into a concave curved-surface shape or a recessed corner-surface shape. A recessed amount of the grinding relief portion is significantly small, and hence does not influence the strength of the tripod type constant velocity universal joint. The grinding width of the outer peripheral surface of the each of the three leg shafts can be stably secured, and grinding quality inspection can be simply and efficiently performed.

As a form of the above-mentioned grinding relief portion, the outer peripheral surface of the each of the three leg shafts, which forms a clearance between the outer peripheral surface and the inner peripheral surface of the inner ring, can be formed to be continuously recessed from one grinding relief portion to another grinding relief portion. Further, the above-mentioned grinding relief portion may be formed at four positions in the circumferential direction on the outer peripheral surface of the each of the three leg shafts. With this, a forging die set for the tripod member can be designed with a higher degree of freedom.

The grinding width of the outer peripheral surface region defined by the above-mentioned grinding relief portion is set as an inspection item for determining grinding quality. Thus, the grinding quality can be determined by sight. As a result, inspection work can be more reliably and efficiently performed, which leads to higher productivity.

According to one embodiment of the present invention, there is provided a method of manufacturing a tripod type constant velocity universal joint, the tripod type constant velocity universal joint comprising: an outer joint member comprising three track grooves each formed so as to have roller-guide surfaces arranged to face each other in a circumferential direction of the outer joint member; a tripod member comprising three leg shafts projecting in a radial direction of the tripod member; and roller units each comprising a roller and an inner ring for supporting the roller in a freely rotatable manner, the inner ring being externally fitted to corresponding one of the three leg shafts, the roller being movable along the roller-guide surfaces of corresponding one of the three track grooves, each of the three leg shafts comprising a region formed into a substantially circular-arc shape in horizontal cross-section that is orthogonal to an axial line of the each of the three leg shafts, the each of the three leg shafts having an outer peripheral surface held in contact with an inner peripheral surface of the inner ring in a direction that is orthogonal to an axial line of the tripod type constant velocity universal joint, the outer peripheral surface of the each of the three leg shafts and the inner peripheral surface of the inner ring having a clearance formed therebetween in a direction of the axial line of the tripod type constant velocity universal joint, the method comprising: forming, in a forging process for the tripod member, a grinding relief portion at an end portion in the circumferential direction of an outer peripheral surface region of the each of the three leg shafts, which is to be held in contact with the inner peripheral surface of the inner ring; and finishing the outer peripheral surface region through grinding. According to the manufacturing method configured as described above, it is possible to stably secure the partial grinding range of the outer peripheral surface of the each of the three leg shafts of the tripod member, and to achieve simple and efficient quality inspection, shortening of grinding cycle time, and reduction in manufacturing cost.

As a specific manufacturing method, it is preferred that the method further comprise: forming the inner peripheral surface of the inner ring into a convex circular-arc shape in vertical cross-section comprising an axial line of the inner ring; forming the outer peripheral surface of the each of the three leg shafts into a straight shape in vertical cross-section comprising the axial line of the each of the three leg shafts; forming the each of the three leg shafts into a substantially elliptical shape in the horizontal cross-section of the each of the three leg shafts, the substantially elliptical shape comprising: a major axis formed in the direction that is orthogonal to the axial line of the tripod type constant velocity universal joint; and a minor axis formed in the direction of the axial line of the tripod type constant velocity universal joint; and slightly advancing and retreating a grinding stone in synchronization with rotation of the each of the three leg shafts about an axial center of the each of the three leg shafts at a time of performing a grinding process on the outer peripheral surface region comprising the major axis of the substantially elliptical shape and to be held in contact with the inner peripheral surface of the inner ring. With this, in the tripod type constant velocity universal joint having the three leg shafts each formed into a special shape such as the substantially elliptical shape so that vibration thereof can be reduced, it is possible to stably secure a grinding width of the outer peripheral surface of the each of the three leg shafts, and to achieve simple and efficient quality inspection, shortening of grinding cycle time, and reduction in manufacturing cost.

A die set for the forging process described above comprises a forming surface for forming the grinding relief portion. Thus, an additional step need not be performed, and hence higher productivity can be achieved.

By providing the above-mentioned grinding relief portion, a region in a required grinding range only needs to be ground, and hence a fast feed range can be widened. Thus, at the time of performing the grinding process on the outer peripheral surface of the each of the three leg shafts that have been subjected to the above-mentioned forging process, the cycle time can be markedly reduced by fast-feeding, during the rotation about the axial center of the each of the three leg shafts, a region in a range except the outer peripheral surface region of the each of the three leg shafts to be held in contact with the inner peripheral surface of the inner ring.

Effects of the Invention

The tripod type constant velocity universal joint and the method of manufacturing the tripod type constant velocity universal joint according to one embodiment of the present invention can provide higher quality by stably securing the grinding range of the outer peripheral surface of each of the three leg shafts of the tripod member, and achieve the simple and efficient quality inspection, the shortening of grinding cycle time, and the reduction in manufacturing cost.

EMBODIMENTS OF THE INVENTION

Now, description is made of embodiments of the present invention with reference to the drawings.

FIGS. 1 to 6 illustrate a tripod type constant velocity universal joint according to a first embodiment of the present invention. The tripod type constant velocity universal joint illustrated in FIGS. 1 to 4 is an example of a tripod type constant velocity universal joint of a type in which leg shafts of a tripod member each comprise regions each formed into a substantially circular-arc shape in horizontal cross-section that is orthogonal to an axial line of the leg shaft, the leg shaft has an outer peripheral surface held in contact with an inner peripheral surface of an inner ring of a roller unit in a direction that is orthogonal to an axial line of the joint, and clearances are formed between the outer peripheral surface of the leg shaft and the inner peripheral surface of the inner ring in a direction of the axial line of the joint. A basic structure and a basic operation of the tripod type constant velocity universal joint are the same as that according to a related art illustrated in FIGS. 12 to 15.

Figure 1:
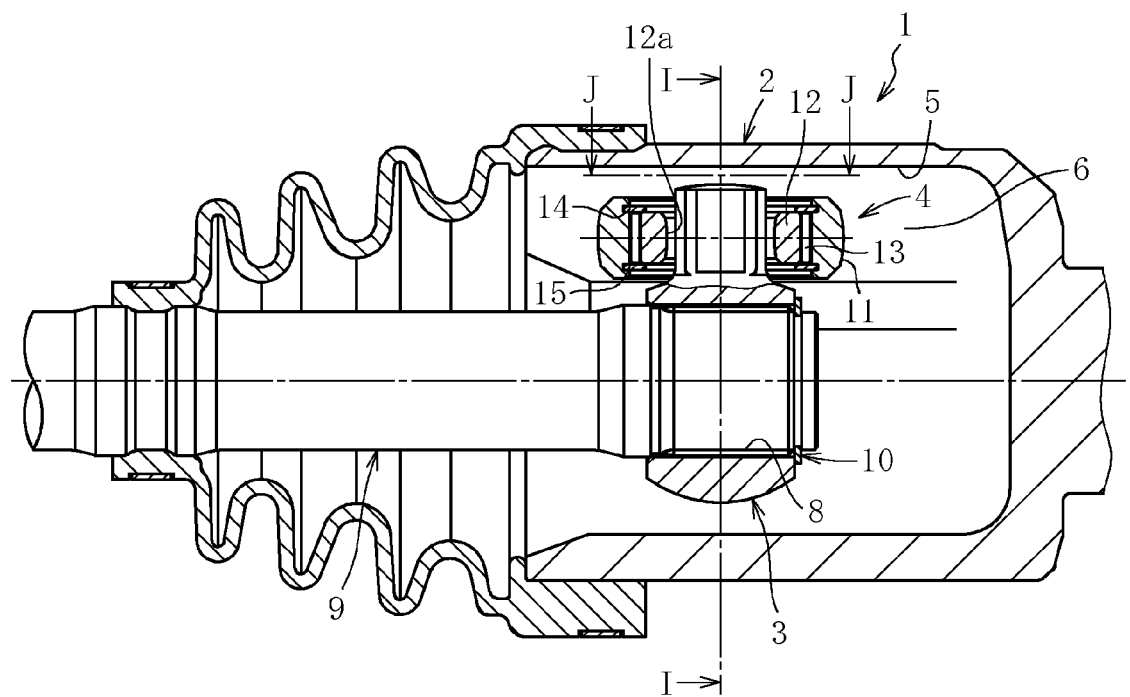
FIG. 1 is a vertical sectional view of a tripod type constant velocity universal joint according to a first embodiment of the present invention.
Figure 2:
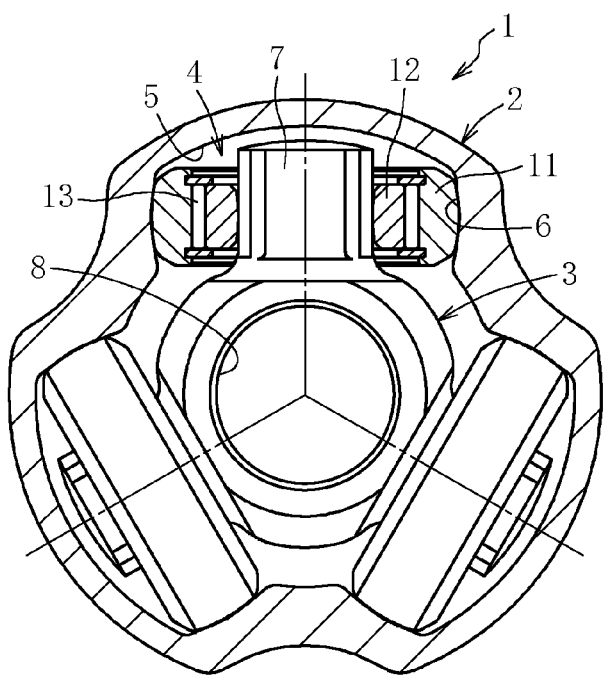
FIG. 2 is a horizontal sectional view taken along the arrow I-I in FIG. 1.

As illustrated in FIGS. 1 and 2, a tripod type constant velocity universal joint 1 comprises, as a main part, an outer joint member 2, a tripod member 3 serving as an inner joint member, and roller units 4 serving as torque transmitting members. The outer joint member 2 is formed into a cup shape that is opened at one end, and has an inner peripheral surface having three linear track grooves 5 equiangularly formed therein so as to extend in an axial direction. On both sides of each of the track grooves 5, there are formed roller-guide surfaces 6 arranged to face each other in a circumferential direction and each extending in the axial direction. The outer joint member 2 receives therein the tripod member 3 and the roller units 4. The tripod member 3 comprises three leg shafts 7 projecting in a radial direction. A shaft 9 is spline-fitted to a center hole 8 of the tripod member 3, and fixed in the axial direction with a stopper ring 10. The roller units 4 each comprise, as a main part, an outer ring 11 serving as a roller, an inner ring 12 arranged inside the outer ring 11 and externally fitted to the leg shaft 7, and needle rollers 13 interposed between the outer ring 11 and the inner ring 12. The roller units 4 are received in the track grooves 5 of the outer joint member 2. The inner ring 12 has an inner peripheral surface 12a formed into a convex circular-arc shape in vertical cross-section comprising an axial line of the inner ring 12. The roller unit 4 has a structure in which the inner ring 12, the needle rollers 13, and the outer ring 11 are prevented from being separated from each other with washers 14 and 15.

Figure 3:
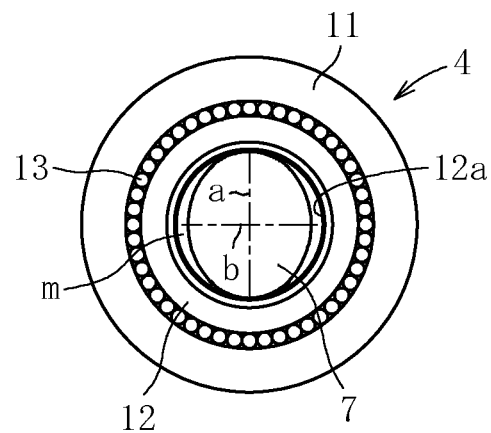
FIG. 3 is a plan view as viewed from the arrow J-J in FIG. 1.
Figure 4:
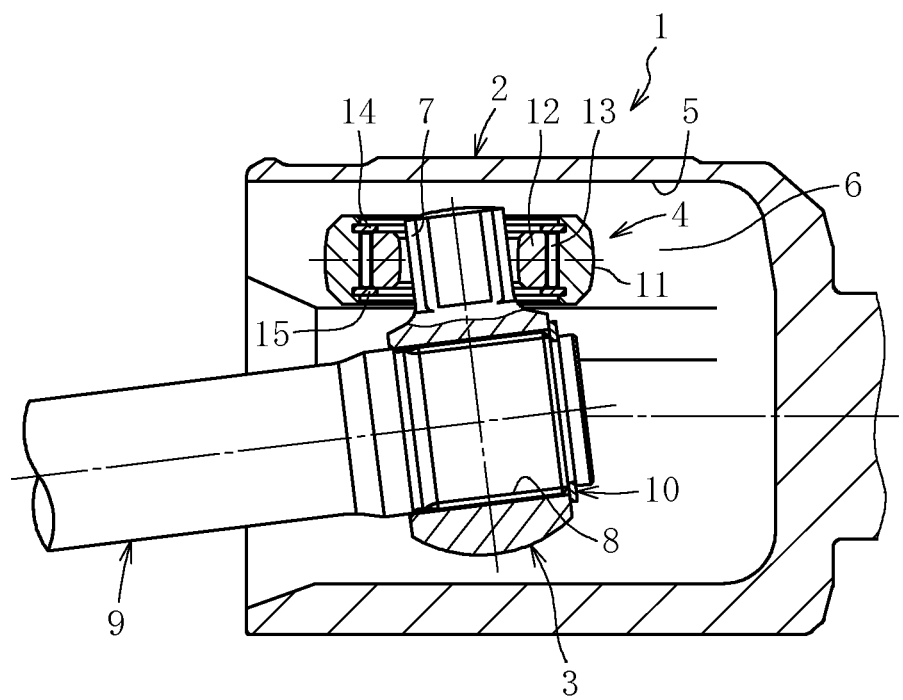
FIG. 4 is a vertical sectional view of a state in which the tripod type constant velocity universal joint according to the embodiment of the present invention forms an operating angle.

The leg shafts 7 of the tripod member 3 each have an outer peripheral surface formed into a straight shape in vertical cross-section comprising an axial line of the leg shaft 7. Further, as illustrated in FIG. 3 corresponding to a plan view as viewed from the arrow J-J in FIG. 1, the outer peripheral surface of the leg shaft 7 is formed into a substantially elliptical shape in horizontal cross-section that is orthogonal to the axial line of the leg shaft 7, and is held in contact with the inner peripheral surface 12a of the inner ring 12 in a direction that is orthogonal to an axial line of the joint, that is, a direction of a major axis "a" in a manner that clearances m are formed between the outer peripheral surface of the leg shaft 7 and the inner peripheral surface 12a of the inner ring 12 in a direction of the axial line of the joint, that is, a direction of a minor axis "b". In the constant velocity universal joint 1, the outer ring 11 of the roller unit 4 mounted to the leg shaft 7 of the tripod member 3 rolls on the roller-guide surfaces 6 of each of the track groove 5 of the outer joint member 2. The leg shaft 7 is formed into a substantially elliptical shape in horizontal cross-section. Thus, as illustrated in FIG. 4, when the constant velocity universal joint 1 forms an operating angle, an axial line of the tripod member 3 is inclined with respect to an axial line of the outer joint member 2. Meanwhile, the roller unit 4 can be inclined with respect to the axial line of the leg shaft 7 of the tripod member 3, and hence the outer ring 11 of the roller unit 4 and the roller-guide surfaces 6 can be avoided from obliquely crossing each other. With this, the roller unit 4 properly rolls. Thus, inductive thrust and sliding resistance can be reduced, with the result that vibration of the joint can be reduced.

Figure 5:
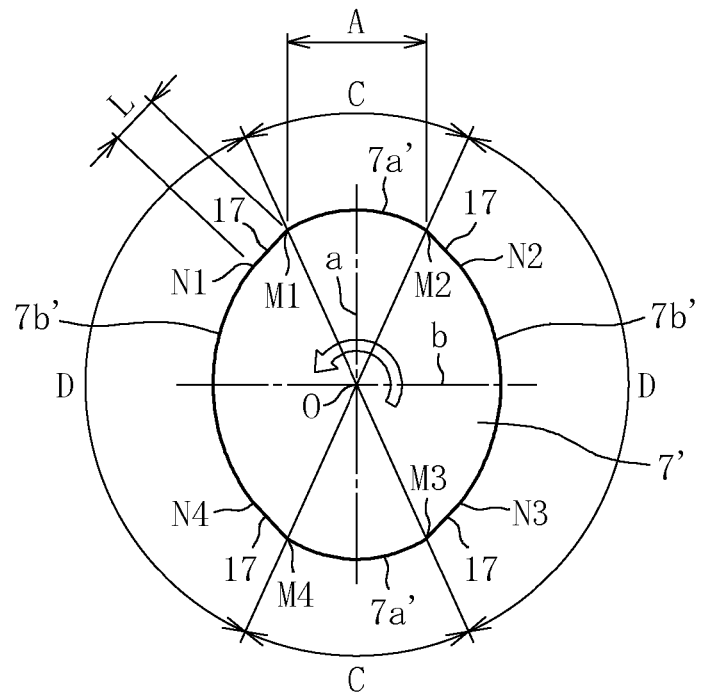
FIG. 5 is a horizontal sectional view of a leg shaft of the tripod type constant velocity universal joint according to the embodiment of the present invention.

Description is made of the leg shaft 7 of the tripod member 3 of the tripod type constant velocity universal joint 1 according to this embodiment. FIG. 5 is an enlarged view of a leg shaft 7' under a state in which heat treatment is completed (prior to a grinding process) in horizontal cross-section that is orthogonal to an axial line O of the leg shaft 7'. The leg shaft 7' comprises outer peripheral surface regions 7a' comprising the major axis "a", outer peripheral surface regions 7b' comprising the minor axis "b", and flat grinding relief portions 17 formed at four positions in the circumferential direction between the outer peripheral surface regions 7a' and the outer peripheral surface regions 7b'. In the horizontal cross-section that is orthogonal to the axial line O of the leg shaft 7', the outer peripheral surface regions 7a' comprising the major axis "a" are each formed into a first elliptical shape, and the outer peripheral surface regions 7b' comprising the minor axis "b" are each formed into a second elliptical shape. With this, the substantially elliptical shape is formed of the first elliptical shape, the second elliptical shape, and the grinding relief portions 17. Of the outer peripheral surface regions of the leg shaft 7', the outer peripheral surface regions 7a' comprising the major axis "a" are held in contact with the inner peripheral surface 12a of the inner ring 12. The minor axis "b" of the second elliptical shape is set to be slightly shorter than a minor axis of the first elliptical shape (not shown). In addition, the outer peripheral surface regions 7a' comprising the major axis "a" and each forming the first elliptical shape are each formed correspondingly to a shape that is obtained by adding substantially uniform grinding margins to elliptical shapes of a finished product.

The grinding relief portions 17 are each formed so as to have a width L in a circumferential direction of the leg shaft 7', and both ends M1 and N1, M2 and N2, M3 and N3, and M4 and N4 are continuous respectively with the outer peripheral surface regions 7a' comprising the major axis "a" and the outer peripheral surface regions 7b' comprising the minor axis "b". The end portions M1, M2, M3, and M4 of the grinding relief portions 17 are each formed so as to have an appropriate relief angle with respect to the outer peripheral surface region 7a' comprising the major axis "a". The outer peripheral surface regions 7b' comprising the minor axis "b" each have both ends that are continuous respectively with the end portions N1 and N4, and N2 and N3 of the grinding relief portions 17 on upper and lower sides with respect to the minor axis "b" in FIG. 5. The outer peripheral surface regions 7b' are each continuously recessed from the end portions N1 and N2 of the grinding relief portions 17 on one side respectively to the end portions N4 and N3 of the grinding relief portions 17 on another side.

As illustrated in FIG. 5, a grinding width of each of the outer peripheral surface regions 7a' comprising the major axis "a" has a permissible dimension A. The grinding relief portions 17 are formed at both end portions in the circumferential direction of the outer peripheral surface regions 7a'. Thus, irrespective of a special configuration in which the outer peripheral surface regions 7a' form the substantially elliptical shape, and irrespective of a size of the grinding margins of the outer peripheral surface regions 7a', grinding is performed in substantially uniform ranges. Thus, partial grinding ranges of the outer peripheral surface of the substantially-elliptical leg shaft of the tripod member can be stably secured. Further, when the grinding width of each of the outer peripheral surface regions 7a' defined by the grinding relief portions 17 is set as an inspection item for determining grinding quality, quality inspection of products that are finished through grinding can be more easily and reliably performed by sight. As a result, a step of the inspection can be more efficiently performed. In addition, the grinding relief portions 17 define grinding regions and fast feed regions, and hence an angle corresponding to the permissible dimension A in which slow grinding feed is needed can be set as a grinding feed range, that is, an angle C. With this, the angle C at which the grinding feed is needed can be markedly reduced and an angle D at which fast feed without grinding is allowed can be markedly increased in comparison with that in the related art. With this, grinding cycle time can be shortened, and manufacturing cost can be reduced. Detailed description of a manufacturing method according to the present invention is given later.

Figure 6A:
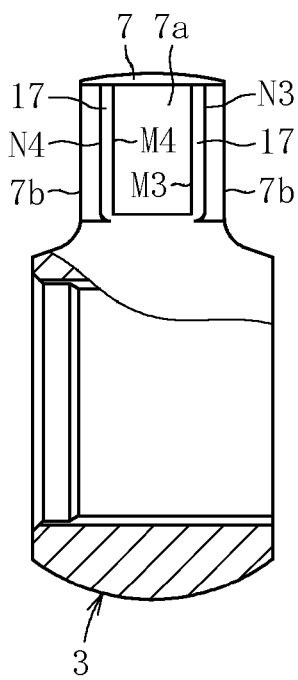
FIG. 6a is a partial vertical sectional view of a tripod member of the tripod type constant velocity universal joint according to the embodiment of the present invention.
Figure 6B:
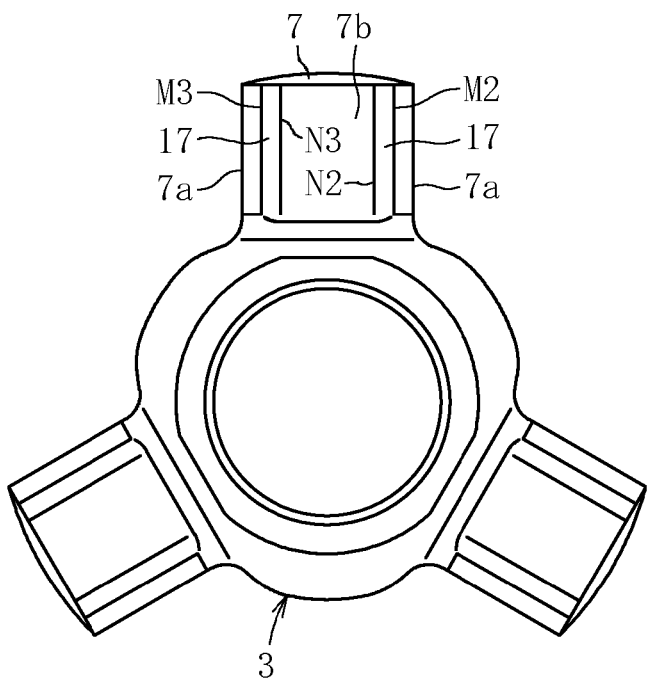
FIG. 6b is a right side view of the tripod member.

FIG. 6 illustrate the tripod member 3 as a finished product obtained by finishing outer peripheral surface regions 7a of each of the leg shafts 7 through grinding. FIG. 6a is a partial vertical sectional view of the tripod member 3, and FIG. 6b is a right side view of FIG. 6a. Regions finished through grinding as illustrated in FIG. 6 correspond to the outer peripheral surface regions 7a comprising the major axis "a" of the elliptical shape, and the grinding relief portions 17 are formed at both end portions in the circumferential direction of the outer peripheral surface regions 7a. Of the outer peripheral surface regions of the leg shaft 7, the outer peripheral surface regions 7a comprising the major axis "a" are held in contact with the inner peripheral surface 12a of the inner ring 12. As illustrated in FIGS. 6a and 6b, outer peripheral surface regions 7b comprising the minor axis "b" are each formed to be continuously recessed from the end portions N1 and N2 of the grinding relief portions 17 on one side respectively to the end portions N4 and N3 of the grinding relief portions 17 on another side. In this way, the tripod member 3 as a finished product is obtained. Thus, as described above, the partial grinding ranges of the outer peripheral surface of the leg shaft can be stably secured, and the quality inspection of products that are finished through grinding can be more easily and reliably performed by sight. As a result, a step of the inspection can be more efficiently performed.

Next, with reference to FIGS. 5 to 7, description is made of a method of manufacturing the tripod type constant velocity universal joint according to an embodiment of the present invention.

Figure 7A:
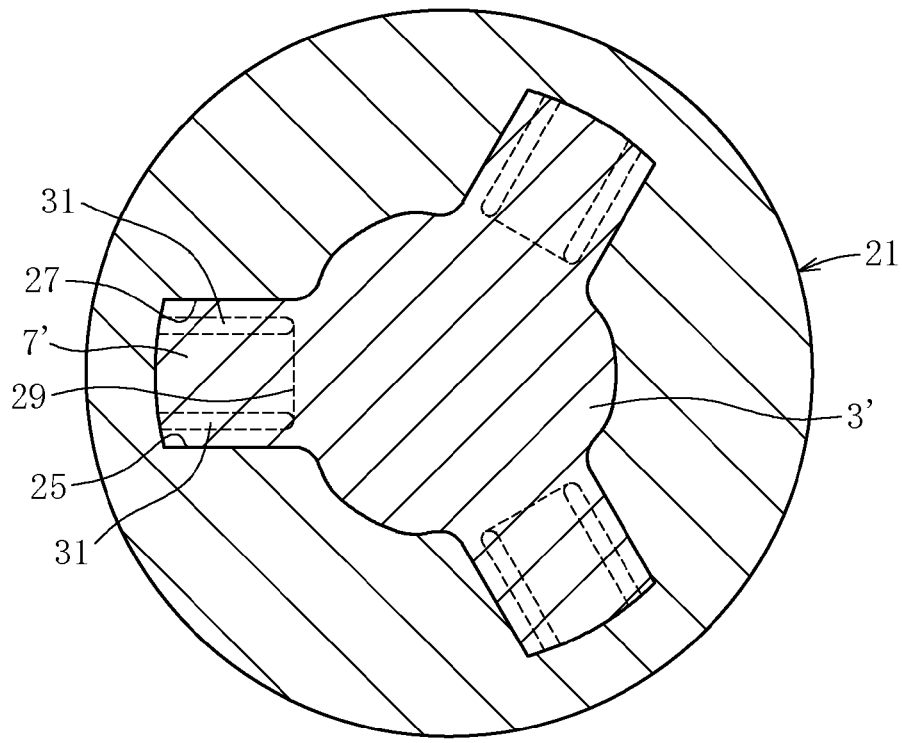
FIG. 7a is a horizontal sectional view of a forging die set for a method of manufacturing the tripod type constant velocity universal joint according to an embodiment of the present invention.
Figure 7B:
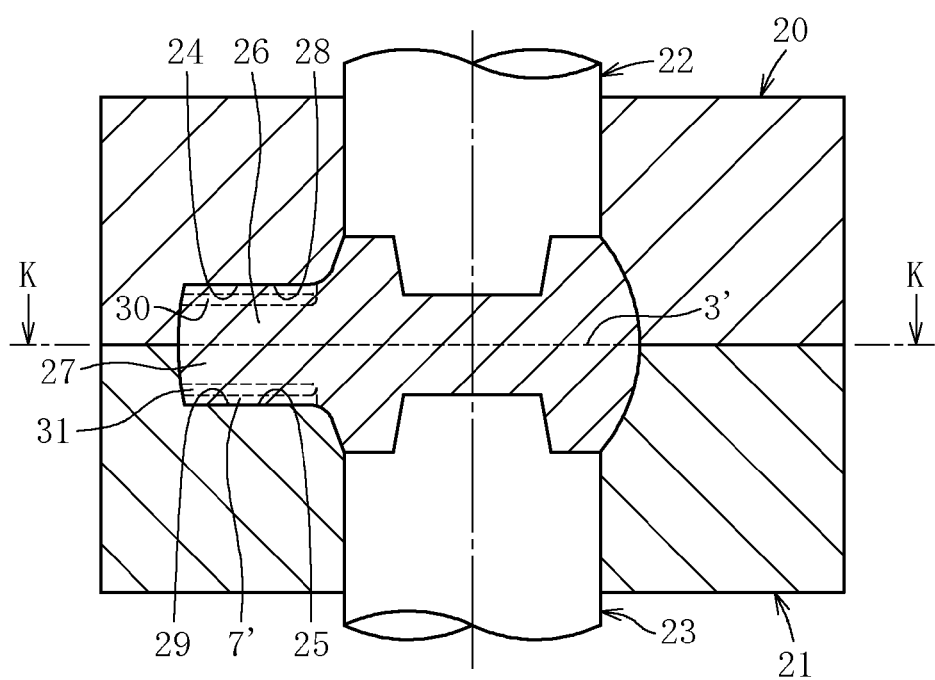
FIG. 7b is a vertical sectional view of the forging die set.

First, with reference to FIG. 7, description is made of a forging step in the manufacturing method according to this embodiment, which is basically the same as that according to the related art. FIG. 7b is a partial vertical sectional view of a die set, and FIG. 7a is a horizontal sectional view taken along the arrow K-K in FIG. 7b. As illustrated in FIGS. 7a and 7b, a forged product 3' of the tripod member is formed through full-enclosed forging using a die set formed of an upper die 20, a lower die 21, an upper punch 22, and a lower punch 23. Specifically, the upper die 20 and the lower die 21 are clamped to each other so as to define a forming space, and a cylindrical billet is put therein. Then, the upper punch 22 and the lower punch 23 are brought close to each other so that the billet is pressurized and filled between the dies 20 and 21. In this way, the forged product 3' comprising the three leg shafts 7' is obtained.

Description is made of forming surfaces of the die set. The upper die 20 and the lower die 21 of the die set have the forming surfaces formed thereon so as to form the grinding relief portions 17 (refer to FIGS. 5 and 6). Specifically, the upper die 20 and the lower die 21 respectively comprise die portions 24 and 25 for forming the leg shafts 7'. The die portion 24 of the upper die 20 has forming surfaces 26 for forming the outer peripheral surface regions 7a' comprising the major axis "a", a forming surface 28 for forming the outer peripheral surface region 7b' comprising the minor axis "b", and forming surfaces 30 for forming the grinding relief portions 17, which are provided between those forming surfaces 26 and 28. Similarly, the die portion 25 of the lower die 21 has forming surfaces 27 for forming the outer peripheral surface regions 7a' comprising the major axis "a", a forming surface 29 for forming the outer peripheral surface region 7b' comprising the minor axis "b", and forming surfaces 31 for forming the grinding relief portions 17, which are provided between those forming surfaces 27 and 29.

The die portion 24 of the upper die 20 and the die portion 25 of the lower die 21 are constructed as described above, and hence, as illustrated in FIG. 5, the outer peripheral surface regions 7a' comprising the major axis "a", the outer peripheral surface regions 7b' comprising the minor axis "b", and the grinding relief portions 17 are formed simultaneously with each other in the forging step for the tripod member 3. In this way, a step of forming the grinding relief portions 17 needs not be additionally performed, and hence higher productivity can be achieved. Further, a recessed amount of the grinding relief portions 17 is significantly small, and hence a burden on the die set is small as well. After the forging step, as in the related art, the forged product of the tripod member 3 is finished through a machining process to have a spline hole, end portions of the leg shafts, and the like, and then is subjected to heat treatment.

Next, description is made of a grinding step with reference to FIG. 5. As described above, under the state in which the heat treatment on the leg shaft 7' is completed (prior to the grinding process), the grinding relief portions 17 are formed at both the end portions in the circumferential direction of the outer peripheral surface regions 7a' comprising the major axis "a". Thus, irrespective of the special configuration in which the outer peripheral surface regions 7a' form the substantially elliptical shape, and irrespective of the size of the grinding margins of the outer peripheral surface regions 7a', grinding is performed in the substantially uniform ranges while securing the permissible dimensions A.

Specific description is made of the state of the grinding process. After centering of the axial center O of the leg shaft 7', the leg shaft 7' is chucked with a grinding apparatus (not shown). This state corresponds to a state in which FIG. 5 is turned to the right at 90°, in other words, the major axis "a" is horizontal. The leg shaft 7' is rotated about the axial center O of the leg shaft 7' at a low grinding feed rate in a counter-clockwise direction (direction of a hollow arrow). With this, the grinding process on the outer peripheral surface regions 7a' is started from the left end M1 in a range of the angle C in FIG. 5. At this time, a rotation center of a grinding stone that has been advanced to a processing position is slightly advanced and retreated only in the horizontal direction in FIG. 5 in synchronization with rotation of the leg shaft 7' about the axial center O so that the outer peripheral surface region 7a' is subjected to the grinding process into the elliptical shape. When the grinding stone reaches the right end M2 in the angle C, the grinding stone is separated from the outer peripheral surface region 7a' of the leg shaft 7'. Then, in a range of the angle D, the leg shaft 7' is rotated through fast feed. Next, when the end portion M3 in the angle C on a lower side in FIG. 5 comes close to the grinding stone, the leg shaft 7' is rotated at the low grinding feed rate again so that the grinding process is performed on the outer peripheral surface region 7a'. Then, when the grinding stone reaches the end portion M4, the grinding stone is separated from the outer peripheral surface region 7a' of the leg shaft 7'. In this way, the grinding process on the first leg shaft 7' is completed. This grinding process on the single leg shaft 7' is completed through a substantially single rotation. After that, the leg shaft 7' is indexed. Then, after centering of the axial center O of a second leg shaft 7', the second leg shaft 7' is chucked with the grinding apparatus, and the grinding process described above is repeated.

In the grinding step of the manufacturing method according to this embodiment, as described above, the grinding relief portions 17 are formed at both the end portions in the circumferential direction of the outer peripheral surface regions 7a' comprising the major axis "a" so that the grinding relief portions 17 define the grinding regions and the fast feed regions. With this, grinding is performed in the substantially uniform ranges while securing the permissible dimensions A, and hence the angle C at which a grinding feed rate is needed can be reduced to a low angle corresponding to the permissible dimension A in which the grinding range is required. Thus, the angle D at which fast feed is allowed can be markedly increased. As a result, grinding cycle time can be shortened, and manufacturing cost can be reduced.

Further, both the end portions in the circumferential direction of the outer peripheral surface regions 7a' comprising the major axis "a" are each a grinding-finished surface defined by the grinding relief portions 17. Thus, the quality inspection of products can be more easily and reliably performed by sight. As a result, a step of the inspection can be more efficiently performed.

Figure 8:
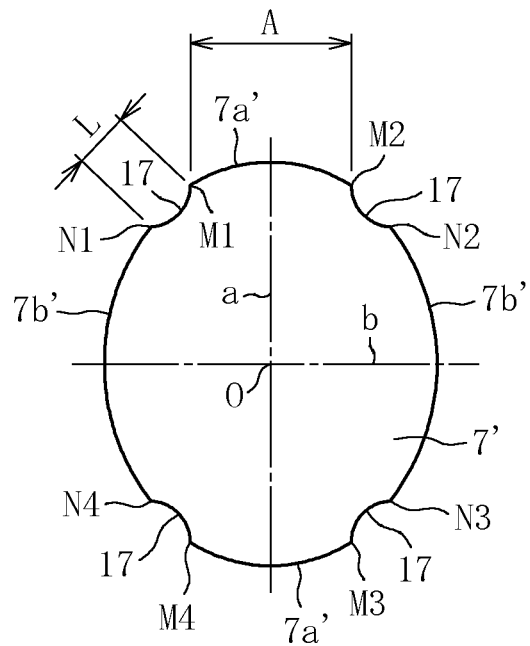
FIG. 8 is a horizontal sectional view of a leg shaft of a tripod type constant velocity universal joint according to a second embodiment of the present invention.

Next, FIG. 8 illustrates a tripod type constant velocity universal joint according to a second embodiment of the present invention. In this embodiment, the grinding relief portions 17 and the outer peripheral surface regions 7b' comprising the minor axis "b", which are provided to each of the leg shafts, are different in form from those in the first embodiment, and other structural details are the same as those in the first embodiment. Also in this embodiment, parts having the same functions as those in the first embodiment are denoted by the same reference symbols, and redundant description thereof is omitted. The same applies to the embodiments to be described later.

FIG. 8 illustrates the leg shaft 7' under the state in which the heat treatment is completed (prior to the grinding process). In this embodiment, the grinding relief portions 17 are each formed into a concave curved-surface shape, and are formed at four positions in the circumferential direction. The outer peripheral surface regions 7b' comprising the minor axis "b" are each formed so as to have the second elliptical shape having a minor axis set to be slightly shorter than a minor axis (not shown) of the first elliptical shape of each of the outer peripheral surface regions 7a' comprising the major axis "a". However, unlike the first embodiment, none of the outer peripheral surface regions 7b' is continuously recessed from the end portions N1 and N2 of the grinding relief portions 17 on one side respectively to the end portions N4 and N3 of the grinding relief portions 17 on another side. Unlike the related art, it only suffices in this embodiment that the grinding relief portions 17 each having the concave curved-surface shape be formed at the four positions in the circumferential direction, and hence design of a forging die set can be simplified. Further, advantages, and a forging step and a grinding step in a manufacturing method according to the second embodiment are the same as those of the above-mentioned tripod type constant velocity universal joint according to the first embodiment, and hence redundant description thereof is omitted.

Figure 9:
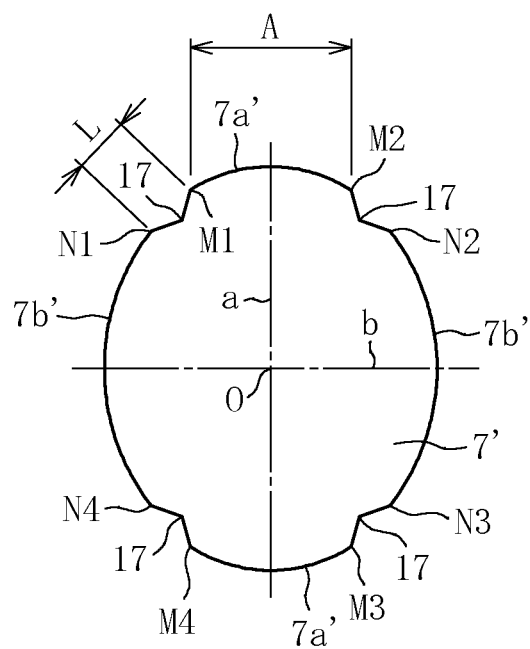
FIG. 9 is a horizontal sectional view of a leg shaft of a tripod type constant velocity universal joint according to a third embodiment of the present invention.
Figure 10:
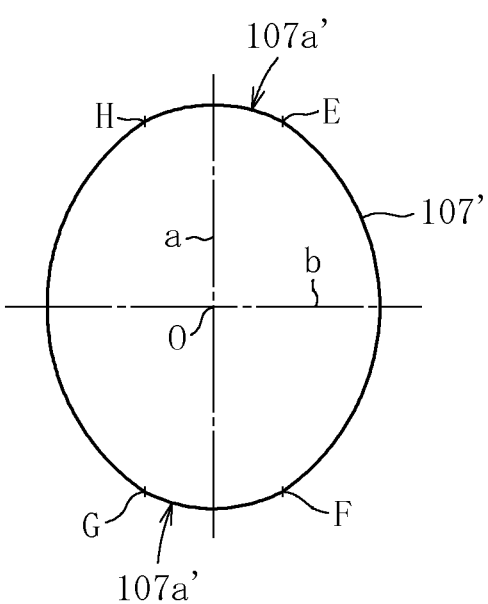
FIG. 10 is an explanatory view of technical findings in the course of development of the present invention.
Figure 11A:
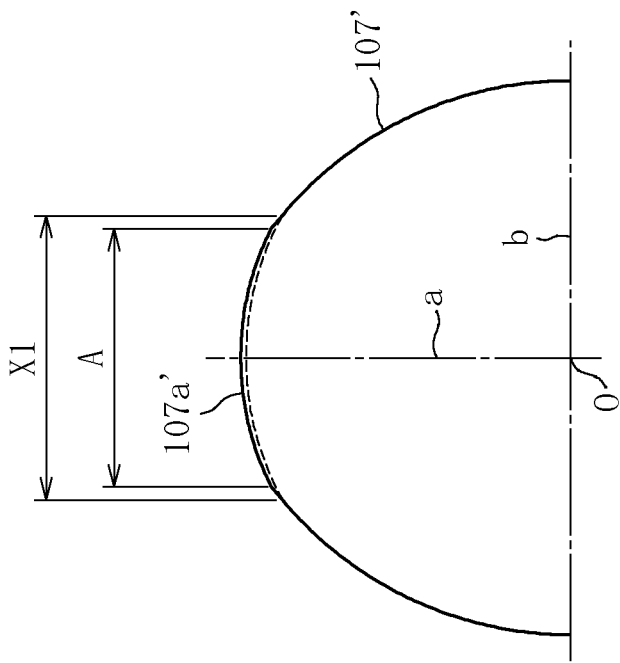
FIG. 11a is an explanatory view of the technical findings in the course of the development of the present invention, for illustrating a ground state in a case where a grinding margin is small.
Figure 11B:
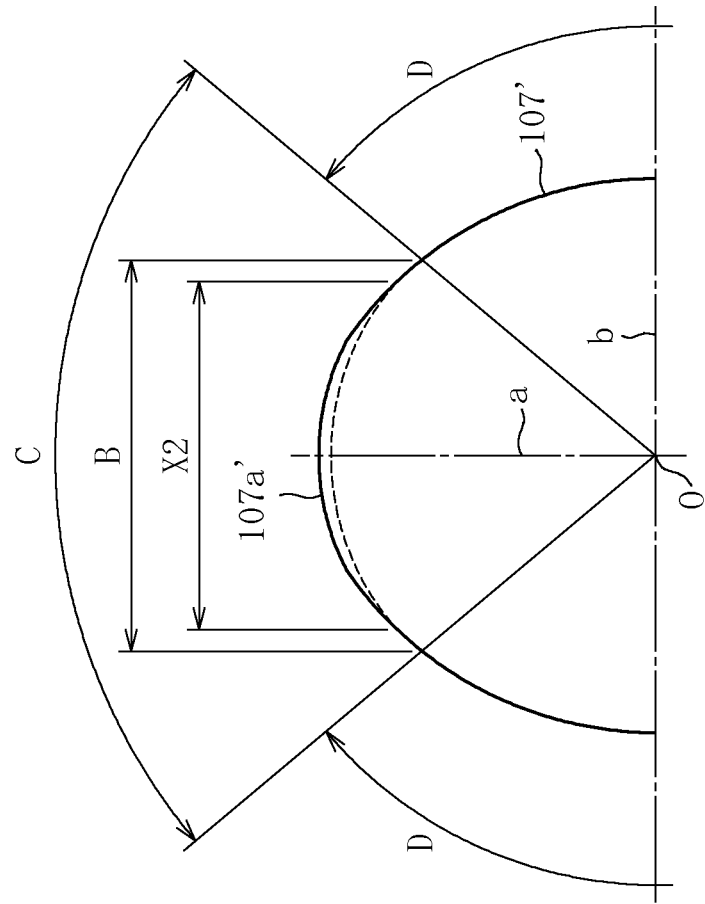
FIG. 11b is an explanatory view of the technical findings in the course of the development of the present invention, for illustrating a ground state in a case where the grinding margin is large.
Figure 12:
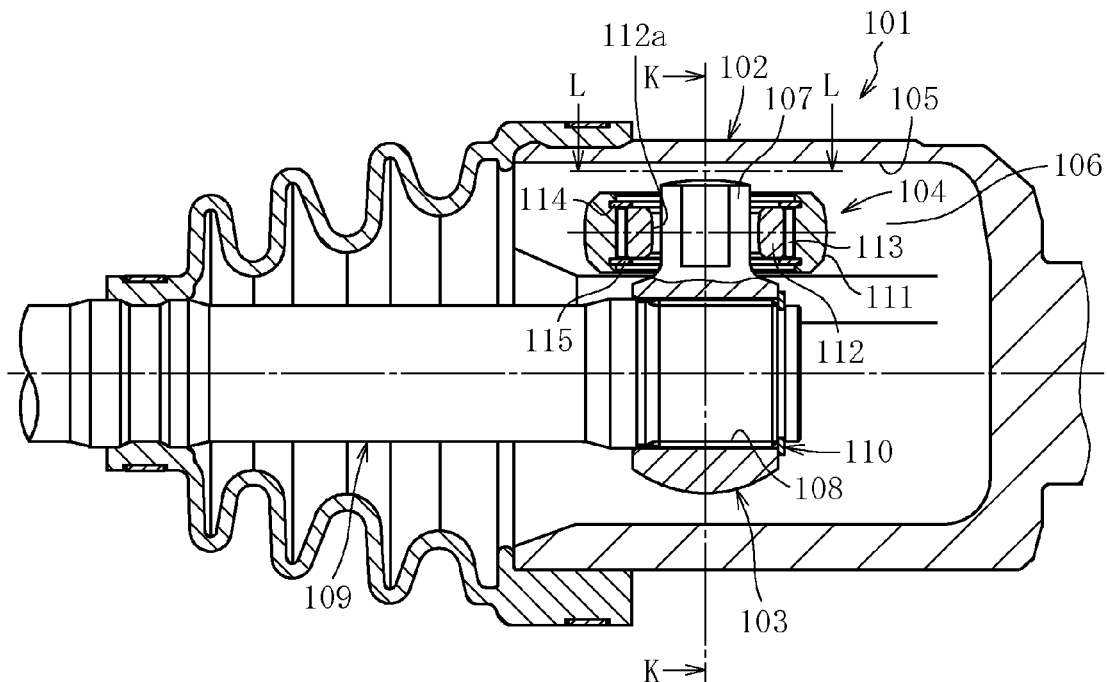
FIG. 12 is a vertical sectional view of a tripod type constant velocity universal joint according to a related art.
Figure 13:
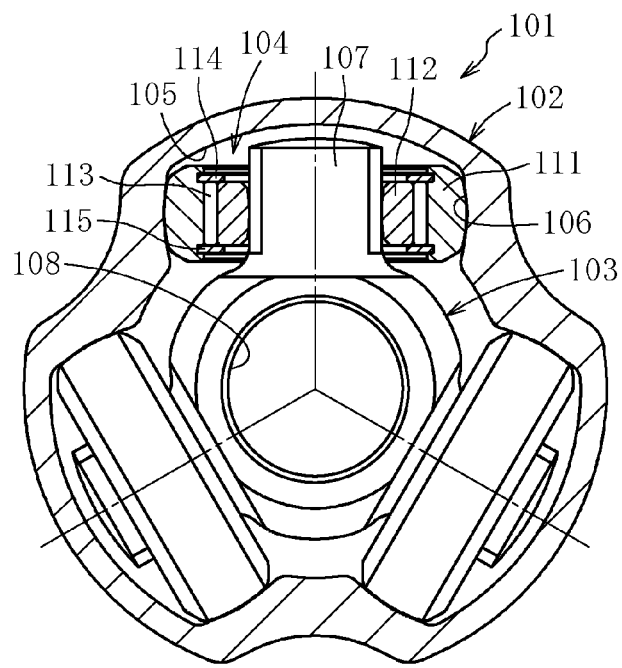
FIG. 13 is a horizontal sectional view taken along the arrow K-K in FIG. 12.
Figure 14:
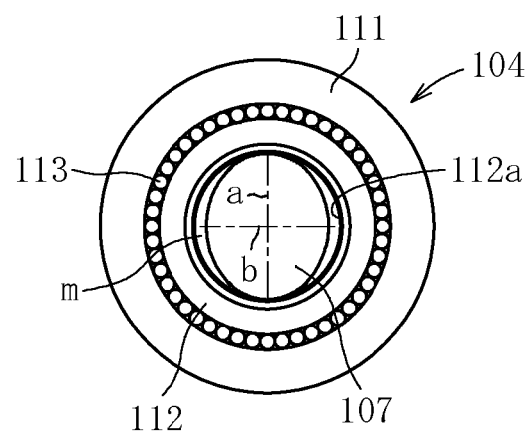
FIG. 14 is a plan view as viewed from the arrow L-L in FIG. 12.
Figure 15:
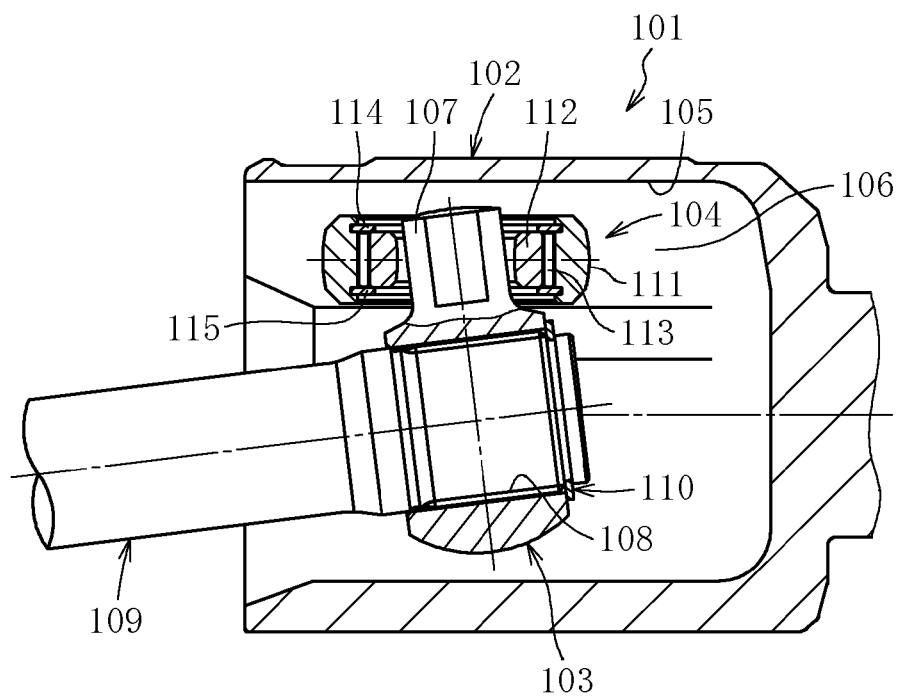
FIG. 15 is a vertical sectional view of a state in which the tripod type constant velocity universal joint according to the related art forms an operating angle.
Figure 16:
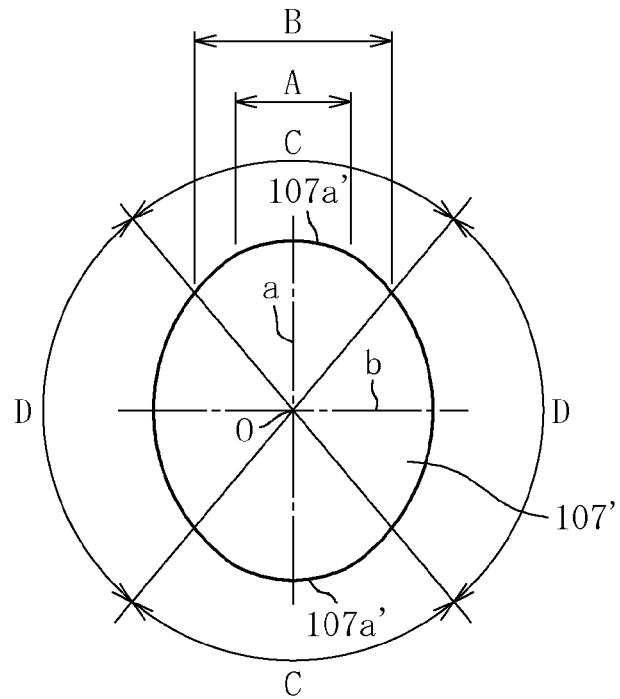
FIG. 16 is a horizontal sectional view of a leg shaft of a tripod member according to the related art.
Figure 17A:
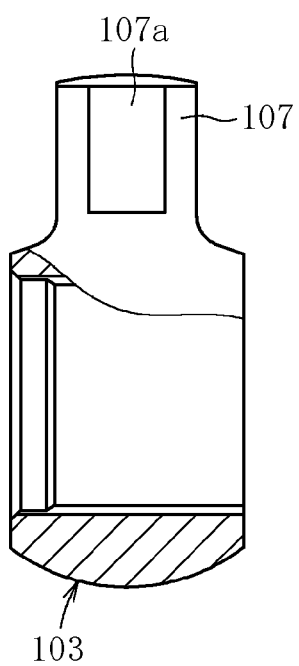
FIG. 17a is a partial vertical sectional view of the tripod member according to the related art.
Figure 17B:
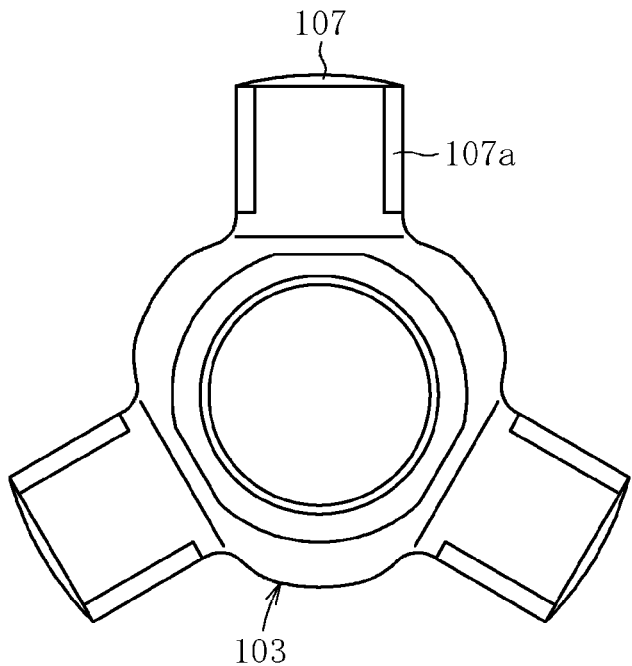
FIG. 17b is a right side view of the tripod member.
Figure 18A:
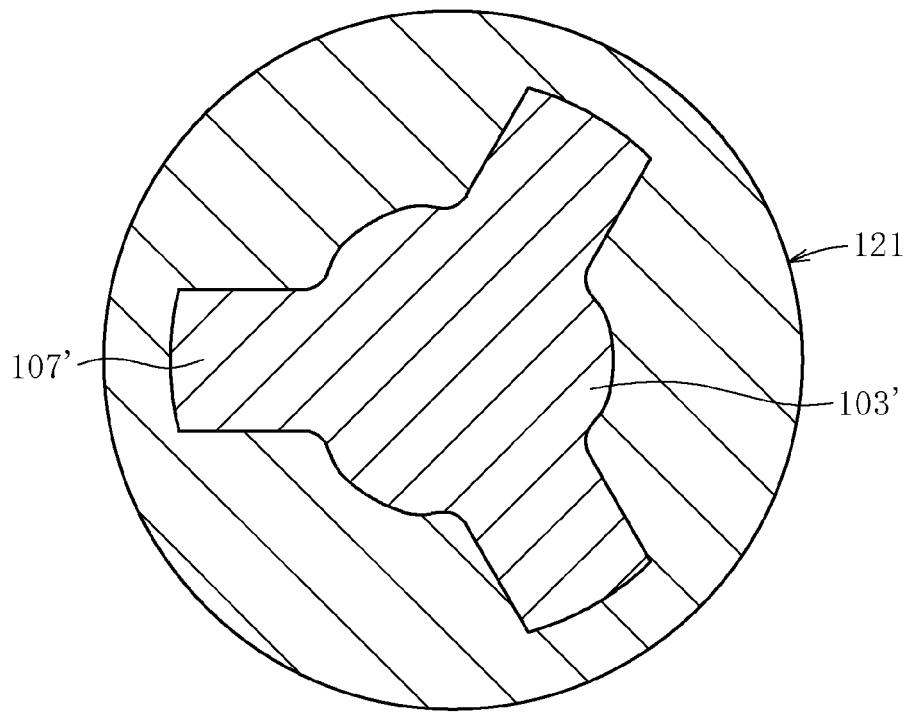
FIG. 18a is a horizontal sectional view of a forging die set for the tripod member according to the related art.
Figure 18B:
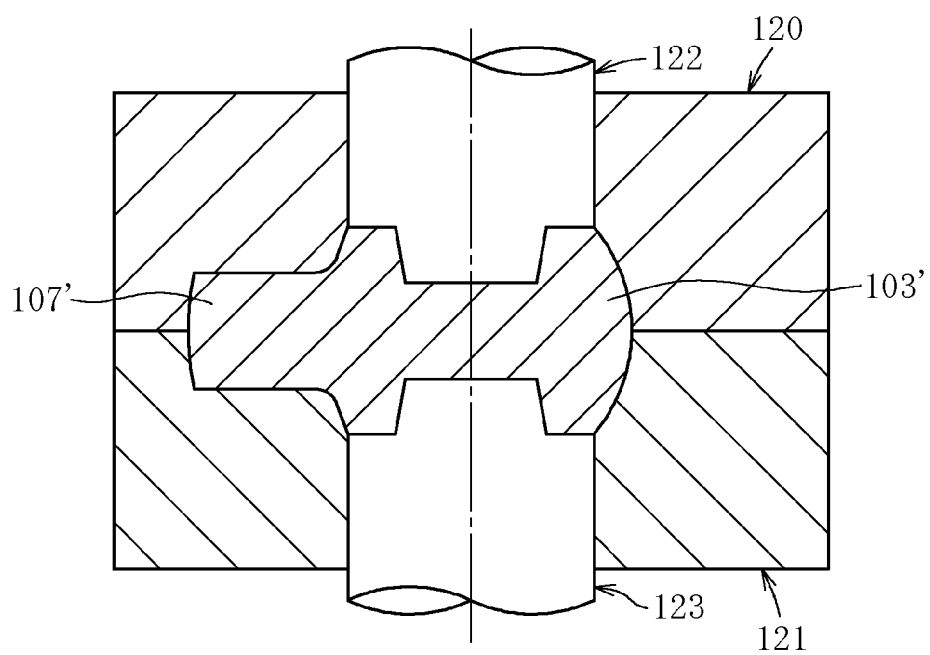
FIG. 18b is a vertical sectional view of the forging die set.

FIG. 9 illustrates a tripod type constant velocity universal joint according to a third embodiment of the present invention. This embodiment is different from the second embodiment only in a form of the grinding relief portions provided to each of the leg shafts. As illustrated in FIG. 9, in this embodiment, the grinding relief portions 17 are each formed into a recessed corner-surface shape, and are formed at four positions in the circumferential direction. Unlike the related art, it only suffices in this embodiment that the grinding relief portions 17 each having the recessed corner-surface shape be formed at the four positions in the circumferential direction, and hence design of a forging die set can be simplified. Also in this embodiment, advantages, and a forging step and a grinding step in a manufacturing method according to the third embodiment are the same as those of the above-mentioned tripod type constant velocity universal joint according to the first embodiment, and hence redundant description thereof is omitted.

In the above-mentioned embodiments, the tripod type constant velocity universal joint in which the leg shafts of the tripod member are each formed into the substantially elliptical shape in horizontal cross-section that is orthogonal to the axial line thereof is described as an example of the tripod type constant velocity universal joint of the type in which the leg shafts of the tripod member each comprise the regions each formed into the substantially circular-arc shape in horizontal cross-section that is orthogonal to the axial line of the leg shaft, the leg shaft has the outer peripheral surface held in contact with the inner peripheral surface of the inner ring of the roller unit in the direction that is orthogonal to the axial line of the joint, and the clearances are formed between the outer peripheral surface of the leg shaft and the inner peripheral surface of the inner ring in the direction of the axial line of the joint. However, the present invention is not limited thereto.

The present invention is applicable also to a tripod type constant velocity universal joint of another type in which the leg shafts of the tripod member are each formed into a cylindrical shape, and held in contact with the inner peripheral surface of the inner ring of the roller unit in the direction that is orthogonal to the axial line of the joint, and a clearance is formed between the leg shaft and the inner peripheral surface of the inner ring in the direction of the axial line of the joint.

Further, the present invention is applicable also to a tripod type constant velocity universal joint of still another type in which the leg shafts of the tripod member are each formed into a spherical shape, and held in contact with the inner peripheral surface of the inner ring of the roller unit in the direction that is orthogonal to the axial line of the joint, and a clearance is formed between the leg shaft and the inner peripheral surface of the inner ring in the direction of the axial line of the joint.

In short, the present invention can be appropriately carried out as long as the tripod type constant velocity universal joint has a structure obtained by partially grinding the substantially circular-arc outer peripheral surface of the leg shaft of the tripod member. Specifically, the grinding relief portions are formed in the outer peripheral surface regions to be finished through grinding so as to define the grinding regions and the fast feed regions, and hence the partial grinding ranges can be stably secured. Further, the grinding width of each of the outer peripheral surface regions defined by the grinding relief portions is set as an inspection item for determining grinding quality, and hence quality inspection of products that are finished through grinding can be more easily and reliably performed by sight. As a result, a step of the inspection can be more efficiently performed. In addition, the angle at which the grinding range is needed can be reduced to a low angle. As a result, the angle at which fast feed is allowed can be markedly increased. Thus, grinding cycle time can be shortened, and manufacturing cost can be reduced.

The present invention is not limited to the above-mentioned embodiments. As a matter of course, various modifications can be made thereto without departing from the spirit of the present invention. The scope of the present invention is defined in claims, and encompasses the meaning of equivalents described in claims and all changes within the scope of claims.

REFERENCE SIGNS LIST 1 tripod type constant velocity universal joint
2 outer joint member
3 tripod member
4 roller unit
5 track groove
6 roller-guide surface
7 leg shaft
7a outer peripheral surface region comprising major axis "a"
7b outer peripheral surface region comprising minor axis "b"
9 shaft
11 outer ring (roller)
12 inner ring
12a inner peripheral surface
13 needle roller
17 grinding relief portion
20 upper die
21 lower die
22 upper punch
23 lower punch
30 forming surface
31 forming surface
73 end portion
74 end portion
75 end portion
A permissible dimension of grinding width
C angle of grinding feed
D angle of fast feed
L width of grinding relief portion
O axial center of leg shaft (axial line)
a major axis
b minor axis
m clearance

The invention claimed is:

1. A tripod type constant velocity universal joint, comprising:
an outer joint member comprising three track grooves each formed so as to have roller-guide surfaces arranged to face each other in a circumferential direction of the outer joint member;
a tripod member comprising three leg shafts projecting in a radial direction of the tripod member; and
roller units, each comprising a roller and an inner ring for supporting the roller in a freely rotatable manner,
the inner ring being externally fitted to a corresponding one of the three leg shafts,
the roller being movable along the roller-guide surfaces of a corresponding one of the three track grooves,
an inner peripheral surface of the inner ring being formed into a convex circular-arc shape in a vertical cross-section comprising an axial line of the inner ring,
an outer peripheral surface of each of the three leg shafts being formed into a straight shape in a vertical cross-section comprising an axial line of a corresponding one of the three leg shafts,
each of the three leg shafts being formed into a substantially elliptical shape in a horizontal cross-section that is orthogonal to an axial line of the corresponding one of the three leg shafts,
a major axis of the substantially elliptical shape being formed in a direction that is orthogonal to an axial line of the tripod type constant velocity universal joint,
the outer peripheral surface of each of the three leg shafts being held in contact with the convex circular-arc shape of the inner peripheral surface of a corresponding one of the inner rings in the direction that is orthogonal to the axial line of the tripod type constant velocity universal joint,
a minor axis of the substantially elliptical shape being formed in a direction of the axial line of the tripod type constant velocity universal joint,
the outer peripheral surface of each of the three leg shafts and the inner peripheral surface of the corresponding one of the inner rings having a clearance formed therebetween in the direction of the axial line of the tripod type constant velocity universal joint,
each of the three leg shafts comprising an outer peripheral surface region comprising the major axis of the substantially elliptical shape that is finished through grinding and held in contact with the inner peripheral surface of the corresponding one of the inner rings, and
each of the three leg shafts comprising a grinding relief portion formed at an end portion in a circumferential direction of the outer peripheral surface region, wherein the grinding relief portion is positioned outside a range where the inner peripheral surface of the corresponding one of the inner rings and the outer peripheral surface region are held in contact with each other.

2. The tripod type constant velocity universal joint according to claim 1, wherein the grinding relief portion is formed into a flat shape.

3. The tripod type constant velocity universal joint according to claim 1, wherein the grinding relief portion is formed into one of a concave curved-surface shape and a recessed corner-surface shape.

4. The tripod type constant velocity universal joint according to claim 1, wherein the outer peripheral surface region defined by the grinding relief portion has a grinding width that is set as an inspection item for determining grinding quality.

5. The tripod type constant velocity universal joint according to claim 1, wherein a proximal end of each of the three leg shafts and a distal end of each of the three leg shafts have the same width.

6. A method of manufacturing a tripod type constant velocity universal joint,
the tripod type constant velocity universal joint comprising:
an outer joint member comprising three track grooves each formed so as to have roller-guide surfaces arranged to face each other in a circumferential direction of the outer joint member;
a tripod member comprising three leg shafts projecting in a radial direction of the tripod member; and
roller units, each comprising a roller and an inner ring for supporting the roller in a freely rotatable manner,
the inner ring being externally fitted to a corresponding one of the three leg shafts,
the roller being movable along the roller-guide surfaces of a corresponding one of the three track grooves,
an inner peripheral surface of the inner ring being formed into a convex circular-arc shape in a vertical cross-section comprising an axial line of the inner ring,
an outer peripheral surface of each of the three leg shafts being formed into a straight shape in a vertical cross-section comprising an axial line of a corresponding one of the three leg shafts,
each of the three leg shafts being formed into a substantially elliptical shape in a horizontal cross-section that is orthogonal to an axial line of the corresponding one of the three leg shafts,
a major axis of the substantially elliptical shape being formed in a direction that is orthogonal to an axial line of the tripod type constant velocity universal joint,
the outer peripheral surface of each of the three leg shafts being held in contact with the convex circular-arc shape of the inner peripheral surface of a corresponding one of the inner rings in the direction that is orthogonal to the axial line of the tripod type constant velocity universal joint,
a minor axis of the substantially elliptical shape being formed in a direction of the axial line of the tripod type constant velocity universal joint, and
the outer peripheral surface of each of the three leg shafts and the inner peripheral surface of the corresponding one of the inner rings having a clearance formed therebetween in the direction of the axial line of the tripod type constant velocity universal joint,
the method comprising:
forming, in a forging process for the tripod member, a grinding relief portion at an end portion in a circumferential direction of an outer peripheral surface region of each of the three leg shafts comprising the major axis of the substantially elliptical shape, which is to be held in contact with the convex circular-arc shape of the inner peripheral surface of the corresponding one of the inner rings, wherein the grinding relief portion is formed at a position in the circumferential direction that is outside a range where the inner peripheral surface of the corresponding one of the inner rings and the outer peripheral surface region are held in contact with each other; and
finishing the outer peripheral surface region through grinding.

7. The method of manufacturing a tripod type constant velocity universal joint according to claim 6, further comprising:
slightly advancing and retreating a grinding stone in synchronization with rotation of each of the three leg shafts about an axial center of each of the three leg shafts at a time of performing a grinding process on the outer peripheral surface region comprising the major axis of the substantially elliptical shape and to be held in contact with the convex circular-arc shape of the inner peripheral surface of the corresponding one of the inner rings.

8. The method of manufacturing a tripod type constant velocity universal joint according to claim 7, further comprising feeding without grinding, at a time of performing a grinding process on the outer peripheral surface of each of the three leg shafts that have been subjected to the forging process, a region in a range except the outer peripheral surface region of each of the three leg shafts to be held in contact with the inner peripheral surface of the corresponding one of the inner rings.

9. The method of manufacturing a tripod type constant velocity universal joint according to claim 6, wherein the forging process is performed by using a die set comprising a forming surface for forming the grinding relief portion.

10. The method of manufacturing a tripod type constant velocity universal joint according to claim 6, further comprising feeding without grinding, at a time of performing a grinding process on the outer peripheral surface of each of the three leg shafts that have been subjected to the forging process, a region in a range except the outer peripheral surface region of each of the three leg shafts to be held in contact with the inner peripheral surface of the corresponding one of the inner rings.

11. The method of manufacturing a tripod type constant velocity universal joint according to claim 6, wherein a proximal end of each of the three leg shafts and a distal end of each of the three leg shafts have the same width.

\* \* \* \* \*